A. T. THOITS & J. G. GRONBERG.
FIRELESS BAKER.
APPLICATION FILED JUNE 19, 1908.

919,494.

Patented Apr. 27, 1909.

Witnesses
H. O. Van Antwerp
Georgiana Chace

Inventors
Alvin T. Thoits and
John G. Gronberg
By Luther V. Moulton
Attorney

UNITED STATES PATENT OFFICE.

ALVIN T. THOITS AND JOHN G. GRONBERG, OF GRAND RAPIDS, MICHIGAN, ASSIGNORS TO CALORIC FIRELESS COOK STOVE COMPANY, OF GRAND RAPIDS, MICHIGAN, A CORPORATION OF MICHIGAN.

FIRELESS BAKER.

No. 919,494.  Specification of Letters Patent.  Patented April 27, 1909.

Application filed June 19, 1908. Serial No. 439,407.

*To all whom it may concern:*

Be it known that we, ALVIN T. THOITS and JOHN G. GRONBERG, citizens of the United States of America, residing at Grand Rapids, in the county of Kent and State of Michigan, have invented certain new and useful Improvements in Fireless Bakers; and we do hereby declare the following to be a full, clear, and exact description of the invention, such as will enable others skilled in the art to which it appertains to make and use the same.

Figure 1:
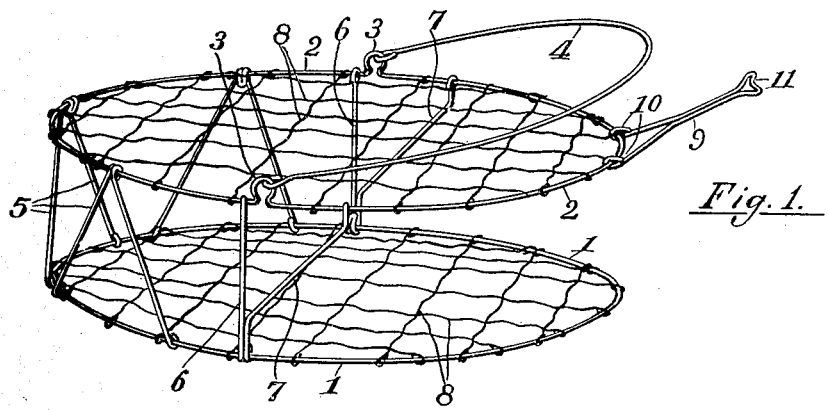
Figure 2:
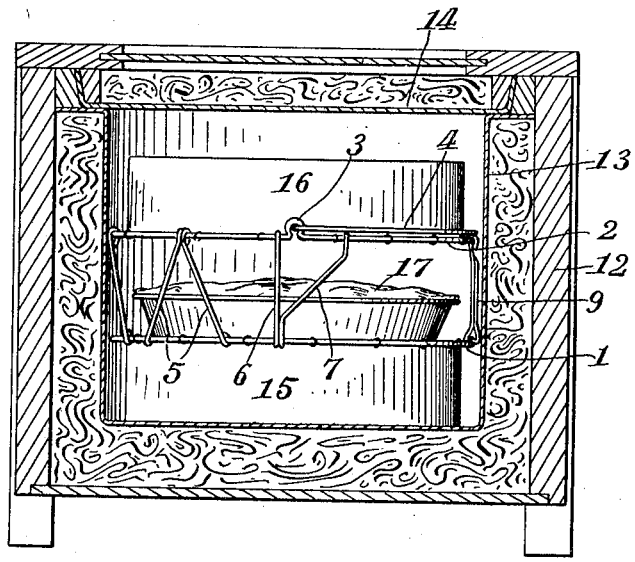

Our invention relates to improvements in fireless bakers and more particularly to means for supporting, placing in the device and removing therefrom, the article to be baked, together with the means for heating the same, and to provide the device with various new and useful features hereinafter more fully described and particularly pointed out in the claims, reference being had to the accompanying drawings in which:

Figure 1. is a perspective of a device embodying our invention; Fig. 2. the same as it appears when in use, shown in side elevation.

Like numbers refer to like parts in both figures.

Our device consists essentially of a wire rack adapted to support the article to be baked and to rest upon one of the heating bodies of the device and to support the other heating body spaced apart from the lower one, said rack being adapted to receive the article to be baked, and support the same between the heating bodies, whereby the article will be properly positioned relative thereto, and also to conveniently remove the upper heating member and the said article, or to place the same within the baker.

Our device consists essentially of an upper and lower platform made of wire comprising a ring forming the frame of each platform; wire netting stretched upon each ring, and supports connecting the rings and spacing the same apart in parallel planes, said supports extending substantially one-half of the circumference of the rings, whereby an article may readily be placed therebetween having substantially the same diameter as the rings, a bail attached to the upper ring, and a brace between the rings detachably connecting the unsupported side of the upper ring with the lower ring.

Referring to the accompanying drawings, 1 represents the lower ring and 2 an upper ring, each preferably made of wire and of substantially the same dimensions, the upper ring being provided with loops 3 at opposite sides to which is pivotally connected a bail 4 for lifting the device.

5 represents a series of diagonal braces connecting the rings throughout a portion only of their circumference and spacing the same apart in parallel planes a proper distance to receive therebetween the article to be baked as represented at 17 in Fig. 2.

At opposite sides and close to the loops 3 are vertically disposed wires 6 extending between and connecting the rings, and from the base of each of these wires extending upward and toward the unconnected front of the rings is a brace 7 adapted to support part of the upper ring at the front. The rings are preferably connected by a wire brace 9 having loops 10 pivotally connecting the same to one of the rings, and a recessed or concave middle portion 11 adapted to engage the other ring, thus effectually spacing apart and supporting the front portions of the rings. By turning this brace out of the way, any convenient dish containing the material to be baked and having substantially the same or less diameter than the rings may be placed between these rings. A wire netting 8 is attached to the respective rings upon the lower one of which rests the article to be baked, and upon the upper one is supported the upper heating body 16, the lower heating body being placed beneath the lower ring and supporting the same, the lower wire netting spacing apart therefrom the article to be baked, whereby the same is not overheated on the bottom.

In use the lower heating body is first placed in the bottom of the baker, the outer case of which is represented by 12, the same being provided with an inner cylindrical lining 13 and closed by a cover 14, this lining being of somewhat greater diameter than the exterior of the rings. The article to be baked and the upper heating body are placed upon the device and the whole lowered into the baker and placed on the lower body by means of the bail 4. After the baking has been accomplished, the upper heater and the baked article is removed by means of the said bail.

What we claim is:

1. In a fireless baker, a rack comprising two superposed platforms, supports connecting the platforms throughout substantially one half of their circumference, whereby a vessel of substantially the diameter of the platforms may be inserted therebetween.

2. In a fireless baker, a rack comprising two superposed platforms, each consisting of a ring and wire netting attached thereto, braces connecting the rings and extending substantially throughout one-half of the circumference of the rings, and a bail attached to the upper ring.

3. In a fireless cooker, a rack comprising two superposed rings, wire netting attached to each ring, diagonal braces connecting the rings at intervals throughout substantially one-half of their circumference, vertically disposed wires connecting the rings at opposite sides, loops in the upper ring near said wires, and a bail pivotally engaging said loops.

4. In a fireless cooker, a rack comprising two superposed rings, wire netting attached to said rings, braces connecting the rings throughout substantially one-half of their circumference and spacing the rings apart in parallel planes, a bail attached to the upper ring, and a vertical brace pivoted to one ring and detachably engaging the other ring.

5. In a fireless cooker, a rack comprising two superposed rings, the upper ring having loops at opposite sides, a bail pivoted to the loops, wire netting attached to each ring, diagonal braces connecting the rings and spacing them apart in parallel planes, vertical braces connecting the rings near the loops, and a brace pivoted to one ring and detachably engaging the other ring, and also located opposite the diagonal braces.

In testimony whereof we affix our signatures in presence of two witnesses.

ALVIN T. THOITS.
JOHN G. GRONBERG.

Witnesses:
GEORGIANA CHACE,
LUTHER V. MOULTON.